United States Patent
Kim et al.

(10) Patent No.: US 7,738,600 B2
(45) Date of Patent: *Jun. 15, 2010

(54) DIGITAL PHASE LOCKED LOOP

(75) Inventors: Younggyun Kim, Irvine, CA (US); Jaekyun Moon, Plymouth, MN (US)

(73) Assignee: DSP Group Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/894,102

(22) Filed: Aug. 20, 2007

(65) Prior Publication Data

US 2007/0286268 A1    Dec. 13, 2007

Related U.S. Application Data (63) Continuation of application No. 10/137,986, filed on May 1, 2002, now Pat. No. 7,272,175.

(60) Provisional application No. 60/312,853, filed on Aug. 16, 2001.

(51) Int. Cl.
- H04L 27/00 (2006.01)
- H03D 3/24 (2006.01)
- H04L 7/00 (2006.01)

(52) U.S. Cl. .......... 375/326; 375/327; 375/355

(58) Field of Classification Search .......... 375/222, 375/344, 345, 355, 362, 226, 316, 326–327, 375/346, 376–377; 370/468, 55, 69.1, 120, 370/281, 295, 302, 335, 379, 441, 480, 299, 370/342–344, 436, 478; 329/304, 306, 307

See application file for complete search history.

(56) References Cited

U.S. PATENT DOCUMENTS

| | | | | |
|---|---|---|---|---|
| 4,079,329 A | * | 3/1978 | England et al. | 329/309 |
| 4,234,957 A | * | 11/1980 | Tracey et al. | 375/332 |
| 5,047,705 A | | 9/1991 | Kishi | |
| 5,282,228 A | * | 1/1994 | Scott et al. | 375/344 |

(Continued)

FOREIGN PATENT DOCUMENTS

EP    0 035 538 A2    9/1989

(Continued)

OTHER PUBLICATIONS

"Optimum Phase-Acquisition Technique for Charge-Pump PLL" Gyoung-Tae Roh et al., IEEE Transactions on Circuits and Systems-II: Analog and Digital Signal Processing, vol. 44, No. 9, Sep. 1997.

(Continued)

*Primary Examiner*—Tesfaldet Bocure
*Assistant Examiner*—Lawrence B Williams
(74) *Attorney, Agent, or Firm*—Shumaker & Sieffert, P.A.

(57) ABSTRACT

Digital communication signals that encode information in the phase may be susceptible to phase error from many sources. A device corrects for carrier and sampling phase errors, as well as additive phase noise. A digital phase locked loop simultaneously tracks the carrier phase error and the sampling phase error, and corrects the signal in the frequency domain. The device may use the sampling phase error to advance or delay the sampling window used to convert the signal from the time domain to the frequency domain.

23 Claims, 6 Drawing Sheets

U.S. PATENT DOCUMENTS

| | | | |
|---|---|---|---|
| 5,521,939 A * | 5/1996 | Miyachi et al. | 375/222 |
| 5,581,579 A * | 12/1996 | Lin et al. | 375/331 |
| 5,870,438 A * | 2/1999 | Olafsson | 375/344 |
| 5,933,454 A | 8/1999 | Cioffi | |
| 6,256,485 B1 | 7/2001 | Heard | |
| 6,463,105 B1 | 10/2002 | Ramesh | |
| 6,473,438 B1 * | 10/2002 | Cioffi et al. | 370/468 |
| 6,628,738 B1 | 9/2003 | Peeters et al. | |
| 6,633,621 B1 | 10/2003 | Bishop et al. | |
| 6,771,713 B1 * | 8/2004 | Lui et al. | 375/326 |
| 6,847,693 B1 * | 1/2005 | Strait | 375/355 |
| 6,891,792 B1 | 5/2005 | Cimini, Jr. et al. | |
| 7,092,458 B2 * | 8/2006 | Chan et al. | 375/326 |
| 7,272,175 B2 | 9/2007 | Kim et al. | |
| 2002/0094052 A1 | 7/2002 | Staszewski et al. | |
| 2003/0026332 A1 * | 2/2003 | Taunton | 375/222 |
| 2003/0058955 A1 | 3/2003 | Raghavan | |

FOREIGN PATENT DOCUMENTS

| | | |
|---|---|---|
| EP | 0 035 558 AA2 | 9/1989 |
| EP | 0 355 587 A2 | 2/1990 |

OTHER PUBLICATIONS

"Dual-Loop DPLL Gear-Shifting Algorithm for Fast Synchronization" Beomsup Kim, IEEE Transactions on Circuits and Systems-II: Analog and Digital Signal Processing, vol. 44, No. 7, Jul. 1997.

The International Search Report from corresponding PCT Application Serial No. PCT/US02/26024 mailed Jan. 3, 2003 (6 pages).

The International Preliminary Examination Report from corresponding PCT Serial No. PCT/US02/26024 mailed Apr. 30, 2003 (4 pages).

* cited by examiner

DIGITAL PHASE LOCKED LOOP

This application is a continuation of U.S. application Ser. No. 10/137,986, filed May 1, 2002, now U.S. Pat. No. 7,272,175 B2, which claims the benefit of U.S. Provisional Application Ser. No. 60/312,853, filed Aug. 16, 2001, the entire content of each of which is incorporated herein by reference.

FIELD

The invention relates to wireless communication and, more particularly, to frequency domain processing of digital communication signals.

BACKGROUND

Wireless communication involves transmission of encoded information on a modulated radio frequency (RF) carrier signal. In a wireless communication system, such as an orthogonal frequency division multiplexing (OFDM) system, the communication signal is encoded as digital information and transmitted by a transmitter. The communication signal is received and decoded by a receiver. Some of the information may be encoded in the phase of the transmitted communication signal.

Many wireless communication systems carry several communication signals simultaneously. Each communication signal may be band-limited and carried on a sub-frequency band of the carrier, also called a sub-carrier "bin." The receiver may receive the carrier and extract an individual communication signal from a sub-carrier bin.

The receiver may also demodulate the communication signal using a free-running oscillator that is independent of the transmitter carrier frequency. In addition, the receiver may periodically sample the received analog carrier signal, which includes all of the individual communication signals, and extract a particular communication signal using digital signal processing techniques. The clock frequency for sampling may be independent of the transmitter clock frequency.

Frequency and phase offsets between transmitter and receiver are generally corrected by the receiver using digital signal processing techniques. For a fast acquisition of these offsets in the receiver, a preamble signal is typically added to the start of the transmitted signal. After this acquisition and corresponding correction, the residual frequency and phase offset become small.

In some cases, however, the phase offset may not necessarily remain small. Because the receiver may demodulate the received carrier signal with an independent free-running oscillator, discrepancies between the carrier frequency and the demodulation frequency of the receiver may contribute phase rotation to the frequency domain signal. This frequency error manifests as a phase shift that increases as time progresses. In addition, the frequency domain signal can be susceptible to additive phase noise.

SUMMARY

The invention is directed to techniques for correcting carrier and sampling phase errors. A digital phase locked loop, sometimes referred to as a PLL or DPLL, estimates the instantaneous carrier phase error and the instantaneous sampling phase error, and processes each phase error in parallel. In particular, the estimated carrier phase error is amplified, filtered with a low-pass filter, and used to control a voltage-controlled oscillator (VCO). The estimated sampling phase error is separately amplified and filtered, and used to control a separate VCO. The output of the voltage-controlled oscillators includes carrier and sampling phase error information, which is used to correct the phase error of the communication signal. In addition to correcting carrier and sampling phase errors, the invention also may compensate for additive phase noise.

Most of the phase tracking and correction can be performed in the frequency domain. Accordingly, the received communication signal is transformed from the time domain to the frequency domain by sampling the signal in a sampling window. The samples may be transformed to the frequency domain with a fast Fourier transform (FFT). The invention may use the sampling phase error to advance or delay the sampling window in the time domain, as needed.

The invention may estimate the carrier and sampling phase errors as a function of the received communication signal. A typical carrier may include pilot tones. Pilot tones are communication signals that carry no information other than known magnitude and phase information. In a signal conforming to a communication standard such as the IEEE 802.11a standard, four sub-carrier bins may be dedicated to carrying known pilot tones. The invention includes techniques for estimating phase errors without relying on pilot tones. Pilot tones may be used for making phase estimates, but the invention may also make phase estimates using communication signals in addition to or other than the pilot tones.

The loop filters and VCO's may include adaptive loop gains. In some embodiments, the adaptive loop gains may implement a "gear-shifting" technique that causes the phase locked loop to react quickly and to reduce the time needed for acquisition. The invention also may employ a technique for modeling the loop to identify coefficients for adaptive loop gains.

In one embodiment, a method comprises receiving a communication signal modulated on a carrier signal, the communication signal including information encoded in a phase of the communication signal, estimating a carrier phase error for the communication signal, estimating a sampling phase error for the communication signal, and adjusting the phase of the communication signal as a function of the carrier phase error and the sampling phase error.

In another embodiment, a device comprises a phase error estimator that estimates an instantaneous carrier phase error and an instantaneous sampling phase error of a communication signal modulated on a carrier signal, the communication signal including information encoded in a phase of the communication signal, a first filter that receives the estimated instantaneous carrier phase error and generates a filtered carrier phase error, a second filter that receives the estimated instantaneous sampling phase error and generates a filtered sampling phase error, and a phase correction element that adjusts the phase of the communication signal as a function of the filtered carrier phase error and the filtered sampling phase error.

In another embodiment, a computer-readable medium comprising instructions that cause a processor to receive a communication signal modulated on a carrier signal, the communication signal including information encoded in a phase of the communication signal, estimate a carrier phase error for the communication signal, estimate a sampling phase error for the communication signal, and adjust the phase of the communication signal as a function of the carrier phase error and the sampling phase error by multiplying the received communication signal by a term with a phase that is a function of the estimated carrier phase error and the estimated sampling phase error.

In another embodiment, an apparatus comprises means for receiving a communication signal modulated on a carrier signal, the communication signal including information encoded in a phase of the communication signal, means for estimating a carrier phase error for the communication signal, means for estimating a sampling phase error for the communication signal, and means for adjusting the phase of the communication signal as a function of the carrier phase error and the sampling phase error.

The invention may provide one or more advantages. In particular, the techniques of the invention may compensate for carrier phase error, sampling phase error and phase noise at substantially the same time. The invention may compensate for phase errors in the frequency domain. The estimated sampling phase error may be used to adjust the sampling window in the time domain, when needed. In addition, the invention may employ gear-shifting techniques to acquire the communication signal quickly.

Additional details of various embodiments are set forth in the accompanying drawings and the description below. Other features, objects and advantages will become apparent from the description and drawings, and from the claims.

DETAILED DESCRIPTION

Figure 1:
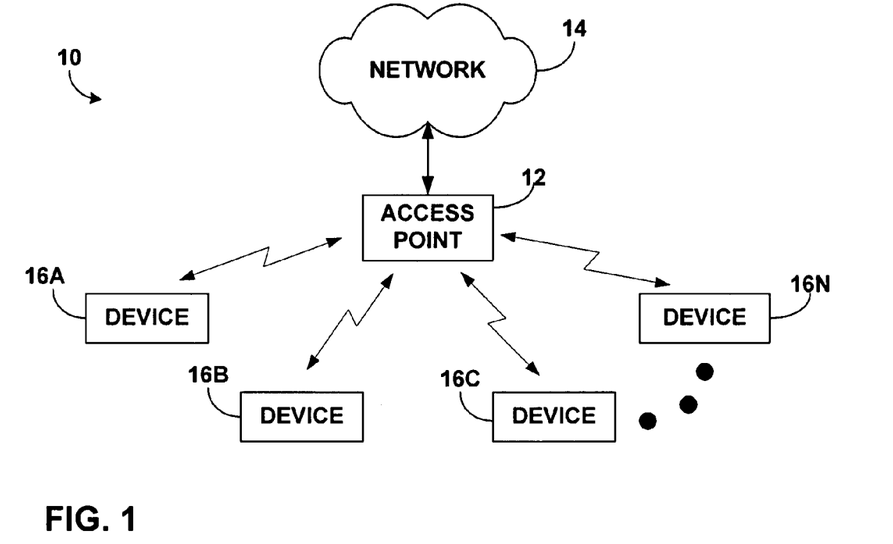
FIG. 1 is a block diagram illustrating a wireless communication network.

FIG. 1 is a block diagram illustrating a wireless communication network 10. As shown in FIG. 1, wireless communication network 10 may include a wireless access point 12 coupled to a wired network 14. Wireless access point 12 permits wireless communication between wired network 14 and one or more wireless communication devices 16A-16N (hereinafter 16). Wireless communication network 10 may be used to communicate data, voice, video and the like between devices 16 and network 14 according to a variety of different wireless transmission standards. Wireless access point 12 may integrate a hub, switch or router to serve multiple wireless communication devices 16.

Figure 2:
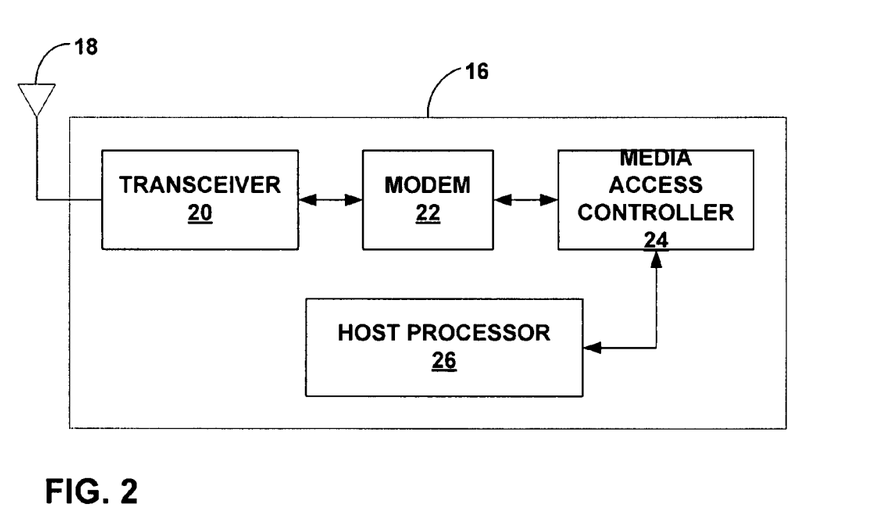
FIG. 2 is a block diagram illustrating a wireless communication device.

FIG. 2 is a block diagram illustrating a wireless communication device 16 in further detail. As shown in FIG. 2, wireless communication device 16 may include an RF antenna 18, a radio 20, modem 22, and media access controller 24 coupled to a host processor 26. Wireless communication device 16 may take the form of a variety of wireless equipment, such as computers, personal computer cards, e.g., PCI or PCMCIA cards, personal digital assistants (PDA's), network audio or video appliances, and the like.

RF antenna 18 transmits and receives RF signals. Radio 20 may include circuitry for upconverting transmitted signals to RF, and downconverting RF signals to baseband. In this sense, radio 20 may integrate both transmit and receive circuitry within a single transceiver component. In some cases, however, transmit and receive circuitry may be formed by separate transmitter and receiver components. For purposes of illustration, discussion herein will be generally limited to the receiver and signal recovery aspects of radio 20.

Modem 22 encodes information in a baseband signal for upconversion to the RF band by radio 20 and transmission via antenna 18. Similarly, modem 22 decodes information from an RF signal received via antenna 18 and downconverted to baseband by radio 20. Media access controller 24 interacts with host processor 26 to facilitate communication between modem 22 and a host wireless communication device 16, e.g., a computer, PDA or the like. Hence, host processor 26 may be a CPU within a computer or some other device. Radio 20, modem 22 and media access controller 24 may be integrated on a common integrated circuit chip, or realized by discrete components.

Wireless communication network 10 (FIG. 1) and wireless communication device 16 (FIG. 2) may conform to a wireless networking standard, such as the IEEE 802.11a standard. The IEEE 802.11a standard specifies a format for the radio frequency (RF) transmission of orthogonal frequency division multiplexed (OFDM) data. The OFDM symbols transmitted according to the IEEE 802.11a standard occupy a 20 MHz bandwidth, which is divided into 64 equally spaced frequency bands.

When the data to be transmitted in an 802.11a system are represented in a complex baseband form with sub-carrier bins numbered −32 to 31 assigned to the individual frequency bands, carrier number 0 is not used. The 0 carrier corresponds to DC, i.e., zero Hz. Likewise, sub-carrier bins −32 to −27 and 27 to 31 at the band edges are also unused. Thus, a carrier signal may include 52 sub-carrier bins. The unused sub-carriers at the band edges provide a guard band that is intended to reduce interference between adjacent channels. The null carrier at zero frequency is intended to aid the design of analog RF circuitry to reduce the effects of signal content at DC, which can be problematic.

Wireless communication network 10 can be configured to make use of a dual channel demodulation technique in accordance with the invention. For example, the dual channel demodulation technique may be used by access point 12 and wireless communication devices 16 for demodulation of received RF signals. A digital demodulator, in combination with an analog demodulation front end, can be used to simultaneously convert two adjacent channels in an RF band to a complex baseband signal.

Figure 3:
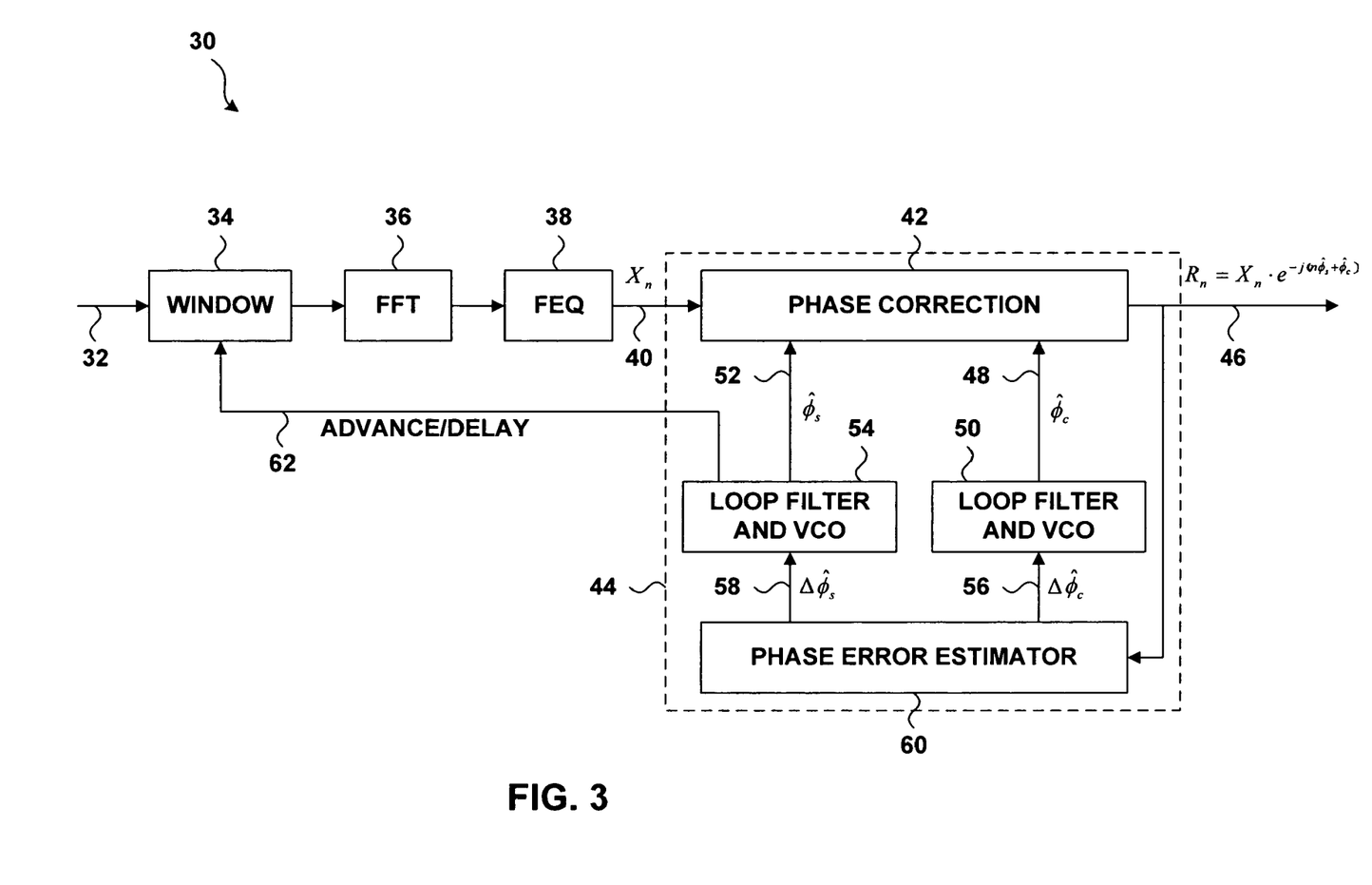
FIG. 3 is a block diagram of a digital phase locked loop useful in the wireless communication device of FIG. 2.

FIG. 3 is a block diagram illustrating a digital phase locked loop 30. Digital phase locked loop 30 may form part of a receiver in wireless communication device. As an example, digital phase locked loop 30 may reside within a wireless transceiver for a wireless local area network (WLAN), such as an IEEE 802.11a wireless network. Digital phase locked loop 30 receives a time-domain carrier signal 32, e.g., via an RF antenna. Carrier signal 32 may include several individual communication signals, each communication signal occupying a sub-carrier bin. Time domain carrier signal 32 may be translated by a frequency converter (not shown in FIG. 3) from a transmission frequency to a another frequency, e.g., a baseband frequency, for decoding prior to receipt by digital phase locked loop 30.

Digital phase locked loop 30 demodulates carrier signal 32 in portions or blocks. A sampler separates the blocks for demodulation. The sampler typically includes an analog-to-digital converter that transforms the received analog carrier signal into a digital carrier signal. The sampler takes a plurality of samples of time-domain signal 32 during a sampling window 34. Sampling window 34 remains "open" for a discrete period of time, during which a fixed number of samples of received time-domain signal 32 can be taken at a particular sampling rate. The duration between samples is the "sampling period," and the sum of all sampling periods equals the duration of sampling window 34. The lengths of the sampling periods are controlled by a sampling clock, which also determines the sampling rate. The sampling clock can be advanced or delayed as will be described below.

The signal sampled in window 34 defines a sequence that is passed to a fast Fourier transform (FFT) 36 for processing in the frequency domain. A frequency equalization (FEQ) element 38 conducts frequency domain equalization to compensate for channel distortions such as phase shift and amplitude change. The output 40 of FEQ 38 is a communication signal of interest 40, denoted $X_n$, which is passed to a phase correction element 42 for phase correction. Phase correction element 42 compensates for the phase rotation based on results from a tracking loop 44, which will be described in more detail below.

Phase correction element 42 performs two distinct forms of phase correction. One form of phase error is carrier phase error, which results from discrepancy between the transmitter carrier frequency and the free-running oscillator frequency of the receiver. Carrier phase error affects demodulation of all signals that may be carried by the carrier, and affects the signals equally.

A second form of phase error is sampling phase error, which results from discrepancy between sampling frequencies of the transmitter and receiver. Sampling phase error does not affect all signals equally. Rather, the amount of sampling phase error depends upon the sub-carrier bin of the signal to be recovered.

In general, a carrier signal in a system such as an OFDM system carries a plurality of communication signals, each communication signal occupying a different sub-carrier bin. The number of sub-carrier bins is denoted by N, and the index of any particular bin is denoted by n. Thus, communication signal $X_n$ was extracted from the nth sub-carrier bin. In a typical OFDM system, such as an IEEE 802.11a system, there may be N=52 bins on a single carrier. Phase correction element 42 compensates for both carrier phase error and sampling phase error of a signal from any sub-carrier bin, and compensates for both types of phase error simultaneously.

Carrier phase error and sampling phase error cannot be measured with precision, but can be estimated using techniques described herein. Estimated carrier phase error is denoted $\hat{\phi}_c$ and estimated sampling phase error is denoted $\hat{\phi}_s$. Phase correction element 42 compensates for carrier phase error and sampling phase error by performing the following frequency domain operation:

$$R_n = X_n \cdot e^{-j(n\hat{\phi}_s + \hat{\phi}_c)} \quad (1)$$

in which $R_n$ is the phase-compensated communication signal 46. Phase compensation results from multiplying communication signal $X_n$ by a term with a magnitude of one but with a phase that is the negative of the sum of the estimated carrier and sampling phase errors. The estimated sampling phase error is preceded by the variable n, thereby correcting the signal for the bin-dependent sampling phase error.

Estimated carrier phase error $\hat{\phi}_c$ is supplied (48) to phase correction element 42 by a loop filter and voltage-controlled oscillator (VCO) element 50. Estimated sampling phase error $\hat{\phi}_s$ is supplied (52) to phase correction element 42 by a separate loop filter and VCO element 54. Loop filter/VCO elements 50 and 54 may serve as digital emulators of the analog counterparts, accumulating and low pass filtering phase error signals. Loop filter/VCO elements 50 and 54 act independently, but may operate in a substantially similar fashion. Loop filter/VCO elements 50 and 54, respectively, receive an estimated instantaneous carrier phase error (56), denoted $\Delta\hat{\phi}_c$, and an estimated instantaneous sampling phase error (58), denoted $\Delta\hat{\phi}_s$, from phase error estimator 60.

Signal processing operations such as sampling in window 34, FFT 36, FEQ 38, phase correction 42, phase estimation 60 and loop filtering 50, 54 may be software-based, and may be carried out by one or more processors. The signal processing operations shown in FIG. 3 may be performed by, for example, a single integrated circuit chip. Alternatively, the signal processing operations shown in FIG. 3 may be performed by discrete electronic components. The invention may be realized by a variety of hardware configurations that implement digital phase locked loop 30.

The invention also includes within its scope any of a variety of computer-readable media comprising instructions for causing a programmable processor to carry out the techniques described herein. Such computer-readable media may include, but are not limited to, magnetic and optical storage media, and further include read-only memory such as erasable programmable read-only memory or flash memory that may be accessed by the processor.

Figure 4:
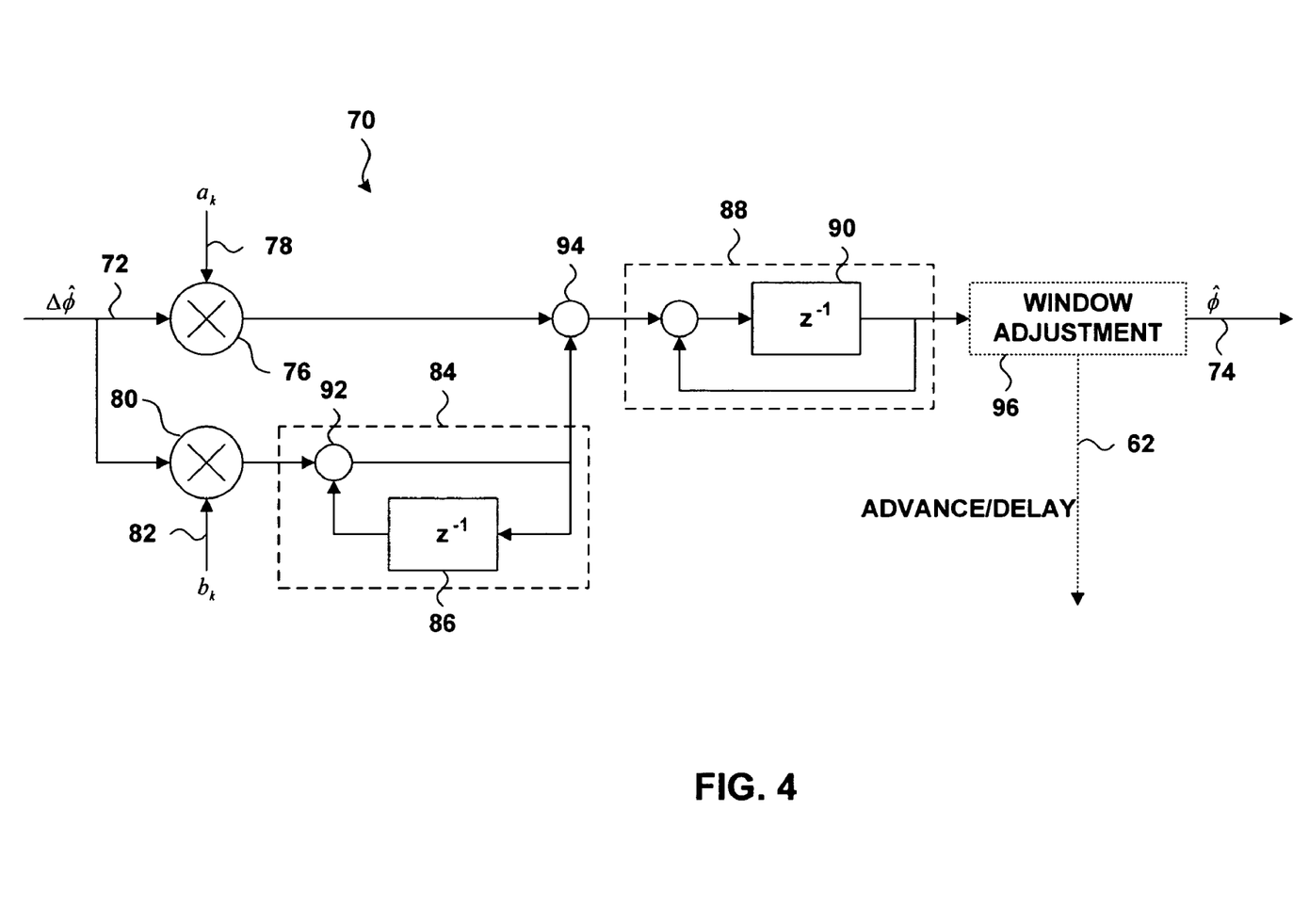
FIG. 4 is a block diagram of a loop filter and VCO useful in the digital phase locked loop of FIG. 3.

FIG. 4 is a block diagram illustrating a loop filter/VCO 70. Loop filter/VCO elements 50 and 54 may each use signal processing techniques exemplified by loop filter/VCO 70. Input to loop filter/VCO 70 is an estimated instantaneous phase error 72, denoted $\Delta\hat{\phi}$. The phase error $\Delta\hat{\phi}$ may represent either $\Delta\hat{\phi}_c$ or $\Delta\hat{\phi}_s$, the carrier and sampling phase errors, respectively. An output of loop filter/VCO 70 is a phase error 74, denoted $\hat{\phi}$, which is passed to phase correction element 42. Phase error $\hat{\phi}$ does not represent an instantaneous phase error, but rather represents a filtered phase error, i.e., a phase error with rapidly varying components removed. Phase error $\hat{\phi}$ may represent either $\hat{\phi}_c$ or $\hat{\phi}_s$.

Estimated instantaneous phase error $\Delta\hat{\phi}$ is multiplied (76) by proportional gain 78, denoted $a_k$. In a separate loop, estimated instantaneous phase error $\Delta\hat{\phi}$ is multiplied (80) by integral gain 82, denoted $b_k$. Techniques for derivation of loop filter gains $a_k$ and $b_k$ will be described below in connection with FIG. 5.

Loop filter/VCO 70 may include two memory elements. In particular, loop filter 84 includes unit time-delay element 86 and VCO loop 88 includes unit time-delay element 90. Loop filter 92 adds (92) an amplified phase error to a time-delayed value, which is then added (94) to a separately amplified phase error and supplied to VCO loop 88. Loop filter 84 cooperates with VCO loop 88 to operate as a voltage-controlled oscillator that removes the rapidly varying components of the estimated phase error. In other words, loop filter 84 and VCO loop 88 behave as a low-pass filter that attenuates potentially rapid changes between successive instantaneous phase errors $\Delta\hat{\phi}$.

In the specific case of loop filter/VCO 54, which tracks sampling phase error, loop filter/VCO 70 may include additional functionality. In particular, loop filter/VCO 70 may also include window adjustment circuitry 96. Window adjustment circuitry 96 receives estimated sampling phase error $\hat{\phi}_s$. When $\hat{\phi}_s$ is larger than $\pi$ radians or smaller than $-\pi$ radians, an advance/delay signal 62 is generated to adjust sampling window 34. When $\hat{\phi}_s$ is larger than $\pi$, window 34 is lagged by one sampling period, and $\hat{\phi}_s$ is set to $\hat{\phi}_s - 2\pi$. When $\hat{\phi}_s$ is smaller than $-\pi$, window 34 is adjusted in the other direction by one sampling period and $\hat{\phi}_s$ is set to $\hat{\phi}_s + 2\pi$. In this way, $\hat{\phi}_s$ remains between $-\pi$ radians and $\pi$ radians. The number of samples taken in sampling window 34 remains unchanged, but window 34 is advanced or delayed by one sampling period with each adjustment. In other words, window adjustment is performed in the time domain. The sampler may include an increment/decrement controller that responds to advance/delay signal 62. Notably, window adjustment is performed when needed to keep $\hat{\phi}_s$ between $-\pi$ radians and $\pi$ radians, and is not necessarily performed after each sampling.

Because the effect of the window adjustment is observed at the input of phase correction element 42 (shown in FIG. 3) with some time delay associated with FFT 36 and FEQ 38, sampling phase error estimate 52 supplied to phase correction element 42 is adjusted with the same delay to either $\hat{\phi}_s - 2\pi$ or $\hat{\phi}_s + 2\pi$. In the case of loop filter/VCO 50, which tracks carrier phase error, window adjustment circuitry 96 is unnecessary.

As shown in FIG. 3, loop filter/VCO elements 50 and 54 receive estimated instantaneous carrier phase error $\Delta\hat{\phi}_c$ and estimated instantaneous sampling phase $\Delta\hat{\phi}_s$ from phase error estimator 60. An embodiment of phase error estimator 60 will now be described.

The instantaneous carrier and sampling phase errors, $\Delta\phi_c$ and $\Delta\phi_s$, cause the phase of the frequency domain signal, denoted $S_n$, to rotate as follows:

$$R_n = S_n \cdot e^{j(n\Delta\phi_s + \Delta\phi_c)} \qquad (2)$$

in which $R_n$ represents the received signal corrupted with phase error, and n represents the sub-carrier index ranging from $-N/2$ to $N/2$. For the sampling phase error, the sub-carriers n and $-n$ suffer from the same amount of phase shift but in the opposite directions. Using these observations, the carrier phase error $\Delta\phi_c$ can be computed by $$\Delta\phi_c = \frac{1}{2}\text{angle}\left(\sum_{n=1}^{N/2}(R_n S_n^*) \cdot (R_{-n} S_{-n}^*)\right) \qquad (3)$$

and the sampling phase error $\Delta\phi_s$ can be computed by $$\Delta\phi_s = \frac{1}{N/2+1}\text{angle}\left(\sum_{n=1}^{N/2}(R_n S_n^*) \cdot (R_{n-N/2-1} S_{n-N/2-1}^*)^*\right). \qquad (4)$$

In formulas (3) and (4), the order of operations may be changed. For example, the angle operation may be performed first, and the averaging, i.e., the summing and dividing, may be performed later. The use of an asterisk in formulas (3) and (4) denotes the complex conjugate, and "angle" represents the operation that extracts the phase angle of a complex number.

Formulas (3) and (4) assume that the uncorrupted frequency domain signal $S_n$ is available, but in practice, the receiver may receive only corrupted signal $R_n$ as shown in FIG. 3. Assuming a low noise condition and small phase rotation, the signal $S_n$ can be reliably estimated. The estimated signal may be denoted $\hat{S}_n$.

Estimated uncorrupted signal $\hat{S}_n$ can be obtained reliably by passing signal $R_n$ through a slicer that performs a mathematical slicing operation. In the case of a four-point quadrature phase shift keying (QPSK) signal, for example, the slicer estimates $\hat{S}_n$ as a function of the quadrant of $R_n$. For example, the slicer may evaluate the real and imaginary portions of $R_n$ and assigns a value to $\hat{S}_n$ as a function of the real and imaginary portions of $R_n$. In particular, $$\text{Re}\{\hat{S}_n\} = \begin{cases} 1 & \text{for Re}\{R_n\} > 0 \\ -1 & \text{otherwise} \end{cases}, \qquad (5)$$

$$\text{Im}\{\hat{S}_n\} = \begin{cases} 1 & \text{for Im}\{R_n\} > 0 \\ -1 & \text{otherwise} \end{cases}.$$

Thus, $\hat{S}_n$ is assigned one of four values: $1+j$, $1-j$, $-1+j$ and $-1-j$. $\hat{S}_n$ may be used in computation of formulas (3) and (4) in place of $S_n$.

Formulas (3) and (4) sum from $n=1$ to $n=N/2$. In practice, carrier and sampling phase errors can be reliably estimated by summing fewer than $N/2$ terms. Summing fewer than $N/2$ terms may result in some loss of performance, but the loss of performance may be counterbalanced by a reduction in complexity of computation and a resulting saving of computational time.

In a signal conforming to a communication standard such as the IEEE 802.11a standard, certain bins may be dedicated to carrying known pilot tones. Pilot tones are communication signals that carry no information other than known magnitude and phase information. Conventional phase correction techniques may refer to the pilot tones for achieving phase correction. Equations (3) and (4), when applied to pilot tones, simplify to the following:

$$\Delta\phi_c = \frac{1}{2}\text{angle}((R_{21} S_{21}^*) \cdot (R_{-21} S_{-21}^*) + (R_7 S_7^*) \cdot (R_{-7} S_{-7}^*)) \qquad (6)$$

$$\Delta\phi_s = \frac{1}{28}\text{angle}((R_7 S_7^*) \cdot (R_{-21} S_{-21}^*)^* + (R_{21} S_{21}^*) \cdot (R_{-7} S_{-7}^*)^*) \qquad (7)$$

where the sub-carrier indices for the pilot tones are $-21$, $-7$, $7$ and $21$. Using equations (6) and (7), carrier and sampling phase errors may be estimated substantially simultaneously. Moreover, equations (6) and (7), may be used without estimating $S_n$, because each value of $S_n$ for the pilot tones is known in advance.

It is not necessary, however, that the computation be limited to pilot tones. The computations may be a function of indices for sub-carriers that carry information. Phase error may be detected using communication signals in two sub-carrier bins, such as bins with sub-carrier indices $-n$ and n, with neither bin carrying a pilot tone. For four sub-carrier indices $-x$, $-y$, $y$ and $x$, for example, equations (3) and (4) simplify to the following:

$$\Delta\phi_c = \frac{1}{2}\text{angle}((R_x S_x^*) \cdot (R_{-x} S_{-x}^*) + (R_y S_y^*) \cdot (R_{-y} S_{-y}^*)) \qquad (8)$$

$$\Delta\phi_s = \frac{1}{x+y}\text{angle}((R_x S_x^*) \cdot (R_{-y} S_{-y}^*)^* + (R_y S_y^*) \cdot (R_{-x} S_{-x}^*)^*). \qquad (9)$$

Sub-carrier indices $-x$, $-y$, $y$ and $x$ may include indices for pilot tones, but reference to pilot tones not necessary to the invention. When a sub-carrier other than a pilot tone is used, $S_n$ may be estimated with a slicer as described above. As with formulas (3) and (4), the order of operations in equations (8) and (9) may be changed without affecting the result.

It is not necessary that the computations be limited to four sub-carrier indices. Any controlled number of indices may be used. In general, increasing the number of indices increases performance but also increases the computational effort needed to make the estimations of carrier and sampling phase error.

Figure 5:
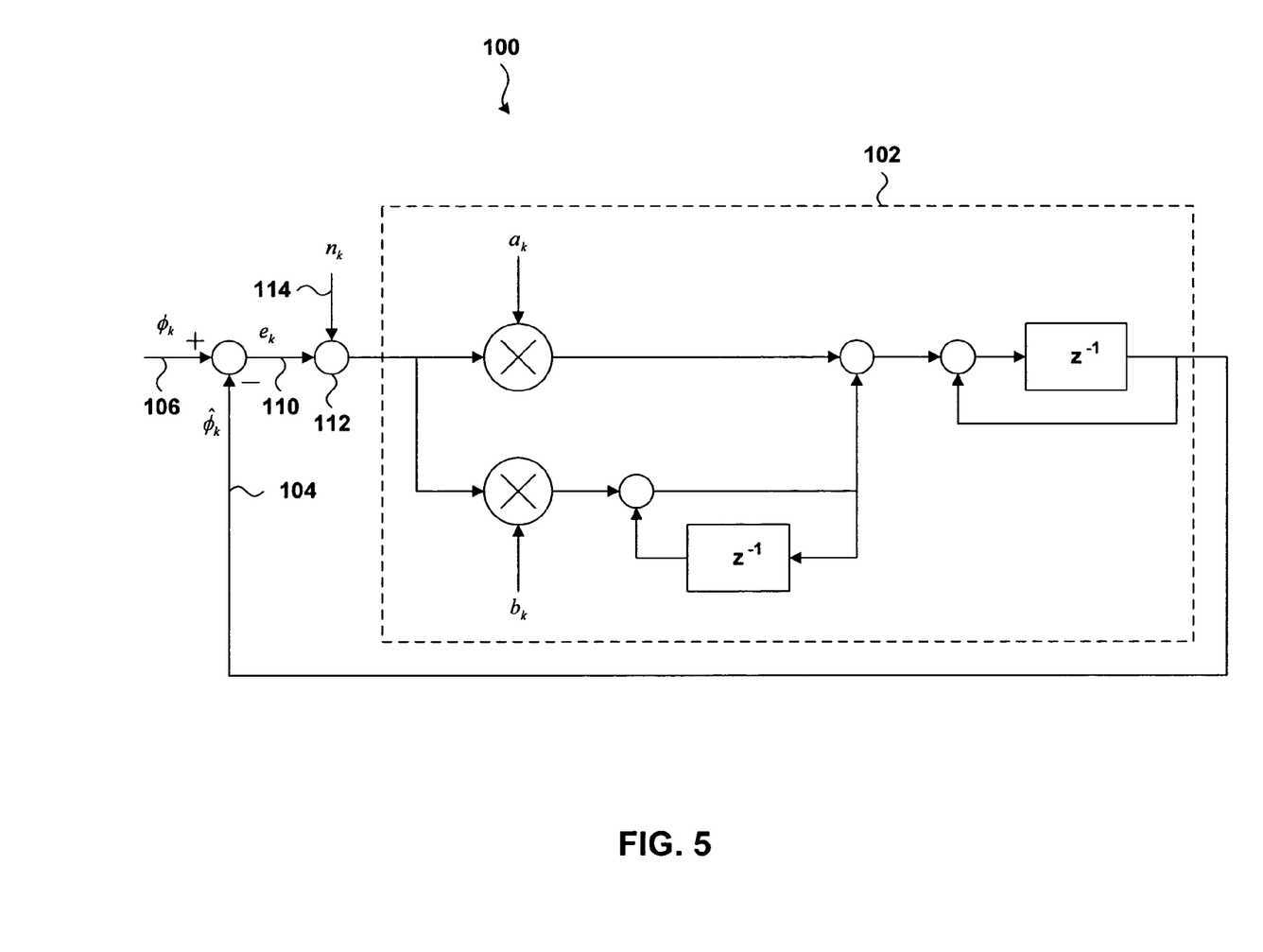
FIG. 5 is a block diagram of a model for finding loop filter gains for the loop filter and VCO shown in FIG. 4.

FIG. 5 is a block diagram illustrating a technique for finding values of loop filter gains $a_k$ and $b_k$. In other words, FIG. 5 represents a model 100 that serves as an analysis tool for designing loop filter/VCO 70 in FIG. 4. Again, loop filter/VCO 70 may be used as the basis for either of loop filter/VCO elements 50, 54 in the example of FIG. 3. Loop filter gains $a_k$ and $b_k$ include the subscript k, meaning that $a_k$ and $b_k$ are time-varying, and each variable may have a different value at time k. Because $a_k$ and $b_k$ are time-varying, the characteristics of loop filter/VCO 70 in FIG. 4 can change adaptively to apply a "gear-shifting" technique.

In general, filter gains $a_k$ and $b_k$ are selected to reduce phase error during a transitional period when the phase locked loop is catching up with the phase error of the received signal, i.e., the phase locked loop is endeavoring to establish a "lock." The process of catching up with the phase error is called "acquisition." When the phase locked loop is in acquisition mode, the carrier and sampling phase errors may be so large that a large signal constellation, such as in 256-point quadrature amplitude modulation or 1024-point quadrature amplitude modulation, cannot practically be used. Moreover, the phase errors in a received signal may increase over time due to conditions such as frequency offset between a transmitter and a receiver. A gear-shifting technique increases the loop bandwidth during acquisition to increase the range of frequencies that can be acquired by the phase locked loop. In addition, a gear-shifting technique causes the loop to react quickly and to reduce the time needed for acquisition, while avoiding instability.

Once the phase locked loop catches up with the phase error, the phase locked loop locks on and begins "tracking" the received signal. The gear-shifting technique cuts back loop bandwidth as acquisition is accomplished and as tracking begins. Cutting back on bandwidth narrows the range of frequencies that can be tracked, but reduces susceptibility to noise. When the phase locked loop enters tracking mode, loop filter gains $a_k$ and $b_k$ typically become substantially constant.

Model 100 in FIG. 5 includes loop filter/VCO 102, similar to loop filter/VCO 70 in FIG. 4. The output 104 of loop filter/VCO 102 is $\hat{\phi}_k$, which represents an estimate of the input phase 106, denoted $\phi_k$. With a frequency offset, the input phase $\phi_k$ will be either an increasing or a decreasing function of time, with its slope proportional to the frequency offset. The output $\hat{\phi}_k$ is subtracted (108) from the estimate of the input phase $\phi_k$, and the difference between $\phi_k$ and $\hat{\phi}_k$ is a residual phase error signal 110, denoted $e_k$.

An additive (112) noise term 114, denoted $n_k$, represents the noise observed at the output of a phase error detector. Noise $n_k$ may be modeled as a random process with a certain distribution. Noise $n_k$ is typically complex.

In general, the goal of designing the loop filter/VCO is to find sequences of coefficients for filter gains $a_k$ and $b_k$ that will minimize the residual error signal $e_k$. More specifically, the problem of optimizing the gain sequences can be stated as:

$$\min_{\{a_k, b_k\}} \sum_{k=1}^{N} e_k^2 \quad (10)$$

in which N is the length of the gain sequence. The problem mathematically defined in problem statement (10) may also include a statistical term representing an expectation.

Figure 6:
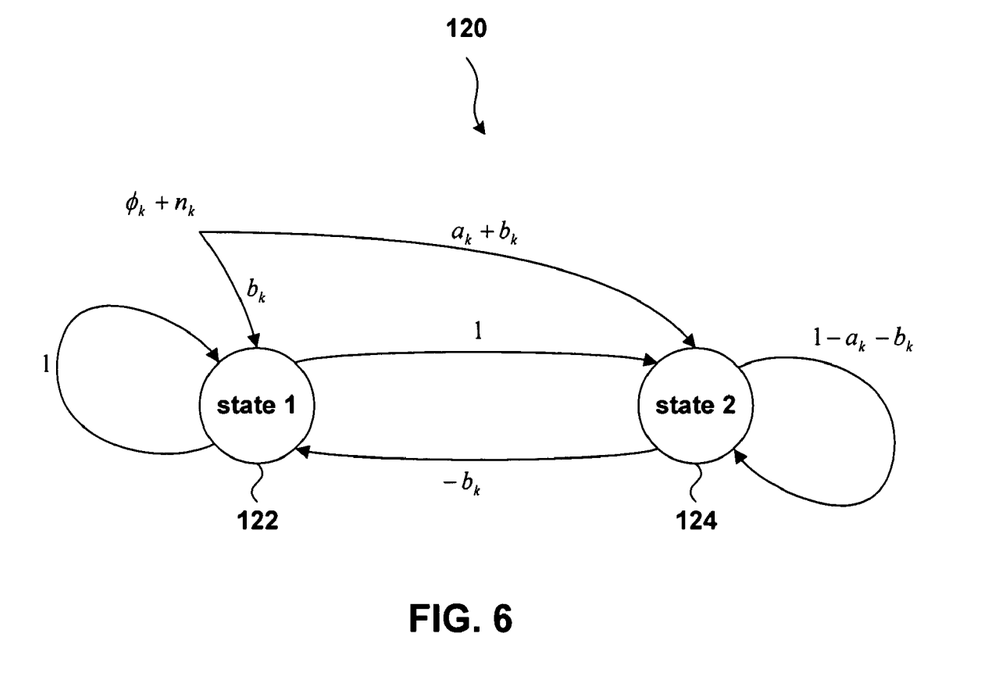
FIG. 6 is a state diagram that maps to the model shown in FIG. 5.

The problem may be mapped to the state diagram 120 shown in FIG. 6. State 1 (122) and state 2 (124) correspond to the content of memory elements 86 and 90 in FIG. 4. The content of states 1 and 2 is in terms of filter gains $a_k$ and $b_k$. The paths shown in FIG. 6 lead to the creation of a state equation of the form $$S_{k+1} = A_k S_k + C_k \phi_k \quad (11)$$

in which $$A_k = \begin{bmatrix} 1 & -b_k \\ 1 & 1 - a_k - b_k \end{bmatrix} \quad (12)$$

and $$C_k = \begin{bmatrix} b_k \\ a_k + b_k \end{bmatrix}. \quad (13)$$

Using state equation (11), the succeeding state may be computed from the current state. In this state transition model, the residual phase error is $$e_k = \phi_k - S_k^{(2)} \quad (14)$$

in which $S_k^{(2)}$ represents the content of state 2 at time k. Noise $n_k$ is a random process, so the state saves the coefficients multiplied to each of the noise samples. Because the second-order statistics are used as shown in problem statement (10), these noise coefficients are sufficient to calculate the metric $e_k^2$ (or with an expectation, $E[e_k^2]$) from problem statement (10) once the noise statistics are known.

Finding optimal values of loop filter gains $a_k$ and $b_k$ may require a search strategy. Because the state content is not finite, a tree-search algorithm may be well-suited for finding optimal values of $a_k$ and $b_k$. In particular, $a_k$ and $b_k$ may be quantized to finite possibilities, thereby making the search space manageable. In addition, gear-shifting in an OFDM system may limit $a_k$ and $b_k$ to a few symbols, thereby limiting the depth of the search tree.

Application of the model shown in FIG. 6 allows sequences for filter gains $a_k$ and $b_k$ to be determined experimentally. Once the filter gains are found, the filter gains may be applied to loop filter/VCO 70 in FIG. 4. In other words, a processor implementing loop filter/VCO 70 may be programmed with filter gain sequences that apply a gear-shifting technique during acquisition.

Figure 7:
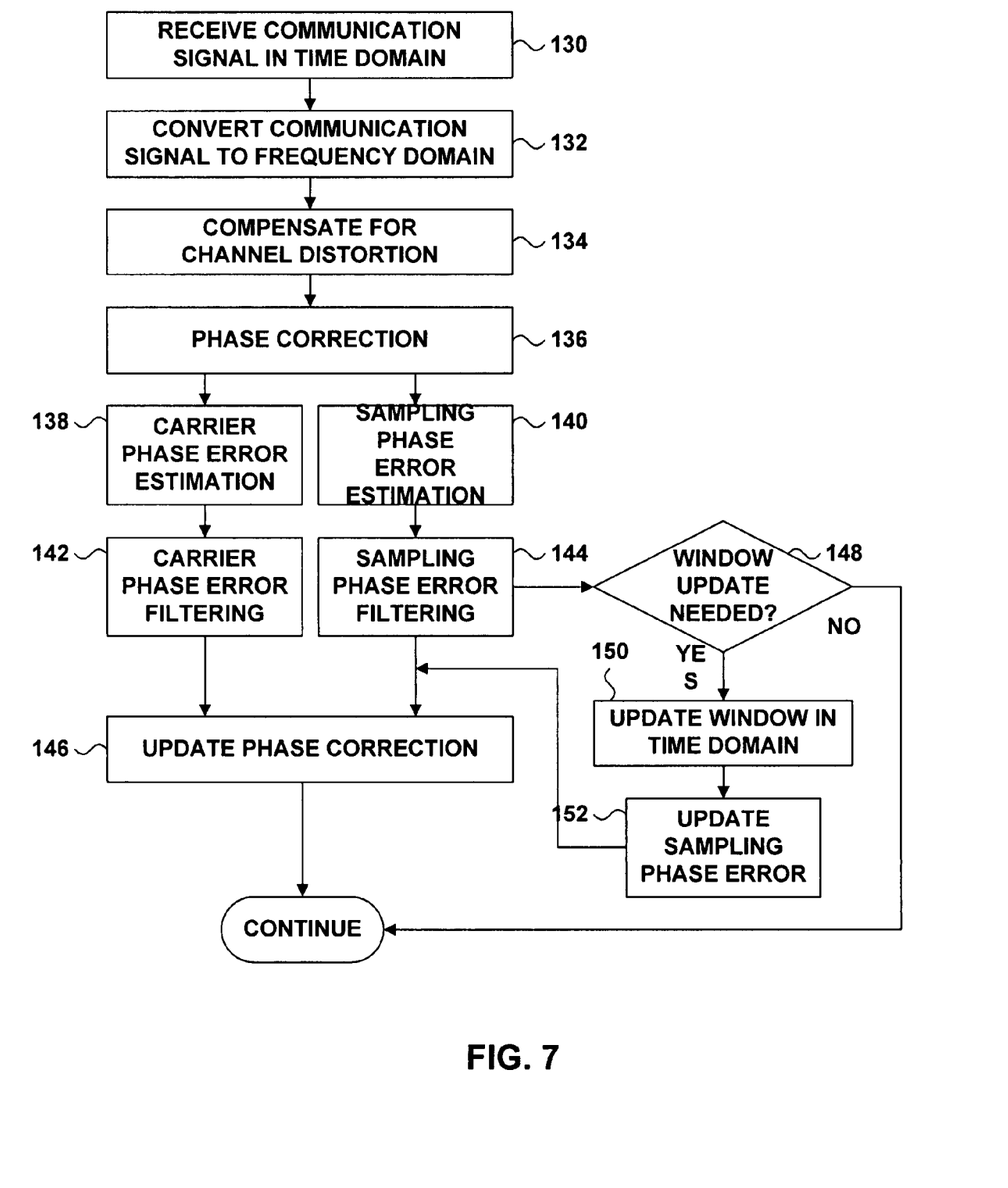
FIG. 7 is a flow diagram illustrating an embodiment of the invention.

FIG. 7 is a flow diagram illustrating an embodiment of the invention. A receiver receives a time domain signal (130) that may include information encoded within the phase of the signal. The signal may be carried by a carrier modulated by a plurality of other signals, each occupying a sub-carrier bin.

The signal may be converted from the time domain to the frequency domain (132) using a technique such as FFT 36. The signal may be sampled with a window that includes a discrete set of samples. Following conversion to the frequency domain, the frequency and phase components pertaining to the signal of interest may be extracted. In addition, FEQ element 38 may compensate for some channel distortions (134).

The signal comprises a sequence in the frequency domain. Each element in the sequence has a magnitude component and a phase component. Tracking loop 44 may correct for carrier phase error and sampling phase error (136), and correct for both forms of phase error substantially simultaneously. The corrected signal is then used by phase error estimator 60 to estimate a current instantaneous carrier phase error (138) and a current instantaneous sampling phase error (140). Loop filter/VCO elements 50 and 54 may filter the carrier phase error (142) and sampling phase error (144) to remove the rapidly varying components. The carrier phase error and sampling phase error may be processed simultaneously in parallel paths. The processed carrier and sampling phase errors are supplied to phase correction element 42 for phase correction of subsequent elements in the sequence (146).

The path processing sampling phase errors may also determine whether window 34 should be advanced or delayed (148). In the event window adjustment circuitry 96 determines that an adjustment to window 34 is indicated, window 34 is advanced or delayed by one sample (150). Adjustments to window 34 take place in the time domain. In addition, the sampling phase error estimate may be updated in the frequency domain (152).

The invention may provide many advantages. The techniques of the invention compensate for carrier phase error and sampling phase error simultaneously, or substantially simultaneously. Not only do the techniques compensate for frequency and phase errors of the carrier and the sampling clock, the techniques also compensate for phase noise.

Furthermore, the invention may compensate for phase errors in the frequency domain, and may use the estimated sampling phase error to adjust the sampling window in the time domain. The sampling window may be adjusted on an as-needed basis. The invention may also apply gear-shifting techniques to acquire a communication signal quickly.

Various embodiments of the invention have been described. These embodiments are illustrative of the practice of the invention. Various modifications may be made without departing from the scope of the claims. For example, the techniques described herein may be used with OFDM systems, such as systems applying the IEEE 802.11a protocol. The techniques are not limited, however, to OFDM or to any particular protocol.

In addition, the invention is not limited to any particular mathematical representation. In FIG. 3, for example, the output 48 of loop filter/VCO element 50 is denoted $\hat{\phi}_c$. Output 48 may also be represented by a signal that carries equivalent phase information, such as $e^{j\hat{\phi}_c}$ or $e^{-j\hat{\phi}_c}$. These and other embodiments are within the scope of the following claims.

The invention claimed is:

1. A method comprising:
   receiving a communication signal modulated on a carrier signal, the communication signal including information encoded in a phase of the communication signal;
   sampling the received communication signal to produce a sampled communication signal;
   estimating a carrier phase error for the sampled communication signal;
   estimating a sampling phase error for the sampled communication signal; and
   adjusting, with a processor, the phase of the sampled communication signal as a function of the carrier phase error and the sampling phase error,
   wherein adjusting the phase of the sampled communication signal as a function of the carrier phase error and the sampling phase error comprises multiplying the sampled communication signal by a term with a phase that is a function of the estimated carrier phase error and the estimated sampling phase error.

2. The method of claim 1, wherein multiplying the sampled communication signal by a term with a phase that is a function of the estimated carrier phase error comprises multiplying the sampled communication signal by a term with a phase that is a negative of the sum of the estimated carrier phase error and the estimated sampling phase error.

3. The method of claim 2, further comprising multiplying the estimated sampling phase error by a constant that is a function of a sub-carrier bin from which the sampled communication signal was extracted.

4. A method comprising:
   receiving a communication signal modulated on a carrier signal, the communication signal including information encoded in a phase of the communication signal;
   sampling the received communication signal to produce a sampled communication signal;
   estimating a carrier phase error for the sampled communication signal;
   estimating a sampling phase error for the sampled communication signal; and
   adjusting, with a processor, the phase of the sampled communication signal as a function of the carrier phase error and the sampling phase error,
   wherein adjusting the phase of the sampled communication signal comprises:
      identifying an index of a sub-carrier bin from which the sampled communication signal was extracted; and
      adjusting the phase of the sampled communication signal as a function of the index of the sub-carrier bin from which the sampled communication signal was extracted, the estimated sampling phase error and the estimated carrier phase error.

5. A method comprising:
   receiving a communication signal modulated on a carrier signal, the communication signal including information encoded in a phase of the communication signal;
   sampling the received communication signal to produce a sampled communication signal;
   estimating a carrier phase error for the sampled communication signal;
   estimating a sampling phase error for the sampled communication signal; and
   adjusting, with a processor, the phase of the sampled communication signal as a function of the carrier phase error and the sampling phase error,
   wherein estimating the carrier phase error comprises:
      estimating a first instantaneous carrier phase error;
      estimating a second instantaneous carrier phase error; and
      filtering components from the second instantaneous carrier phase error that vary rapidly from the first instantaneous carrier phase error to generate the estimated carrier phase error.

6. A method comprising:
   receiving a communication signal modulated on a carrier signal, the communication signal including information encoded in a phase of the communication signal;
   sampling the received communication signal to produce a sampled communication signal;
   estimating a carrier phase error for the sampled communication signal;
   estimating a sampling phase error for the sampled communication signal; and
   adjusting, with a processor, the phase of the sampled communication signal as a function of the carrier phase error and the sampling phase error,
   wherein estimating the sampling phase error comprises:
      estimating a first instantaneous sampling phase error;
      estimating a second instantaneous sampling phase error; and filtering components from the second instantaneous sampling phase error that vary rapidly from the first instantaneous sampling phase error to generate the estimated sampling phase error.

7. The method of claim 1, wherein receiving a communication signal modulated on a carrier signal comprises receiving a communication signal modulated on a wireless carrier signal.

8. A device comprising:
a sampler that samples a received communication signal modulated on a carrier signal to produce a sampled communication signal, the received communication signal including information encoded in a phase of the received communication signal;
a phase error estimator that estimates an instantaneous carrier phase error and an instantaneous sampling phase error of the sampled communication signal;
a first filter that receives the estimated instantaneous carrier phase error and generates a filtered carrier phase error;
a second filter that receives the estimated instantaneous sampling phase error and generates a filtered sampling phase error; and
a phase correction element that adjusts the phase of the sampled communication signal as a function of the filtered carrier phase error and the filtered sampling phase error,
wherein the phase correction element multiplies the sampled communication signal by a term with a phase that is a function of the estimated carrier phase error and the estimated sampling phase error.

9. The device of claim 8, wherein the phase correction element multiplies the sampled communication signal by a term with a phase that is a negative of the sum of the estimated carrier phase error and the estimated sampling phase error.

10. The device of claim 9, wherein the phase correction element multiplies the estimated sampling phase error by a constant that is a function of a sub-carrier bin from which the sampled communication signal was extracted.

11. A device comprising:
a sampler that samples a received communication signal modulated on a carrier signal to produce a sampled communication signal, the received communication signal including information encoded in a phase of the received communication signal;
a phase error estimator that estimates an instantaneous carrier phase error and an instantaneous sampling phase error of the sampled communication signal;
a first filter that receives the estimated instantaneous carrier phase error and generates a filtered carrier phase error;
a second filter that receives the estimated instantaneous sampling phase error and generates a filtered sampling phase error; and
a phase correction element that adjusts the phase of the sampled communication signal as a function of the filtered carrier phase error and the filtered sampling phase error,
wherein the phase correction element identifies an index of a sub-carrier bin from which the sampled communication signal was extracted, and adjusts the phase of the sampled communication signal as a function of the index of the sub-carrier bin from which the sampled communication signal was extracted, the estimated carrier phase error and the sampling phase error.

12. A device comprising:
a sampler that samples a received communication signal modulated on a carrier signal to produce a sampled communication signal, the received communication signal including information encoded in a phase of the received communication signal;
a phase error estimator that estimates an instantaneous carrier phase error and an instantaneous sampling phase error of the sampled communication signal;
a first filter that receives the estimated instantaneous carrier phase error and generates a filtered carrier phase error;
a second filter that receives the estimated instantaneous sampling phase error and generates a filtered sampling phase error; and
a phase correction element that adjusts the phase of the sampled communication signal as a function of the filtered carrier phase error and the filtered sampling phase error,
wherein the first filter receives a first instantaneous carrier phase error, receives a second instantaneous carrier phase error, and filters components from the second instantaneous carrier phase error that vary rapidly from the first instantaneous carrier phase error to generate the filtered carrier phase error.

13. A device comprising:
a sampler that samples a received communication signal modulated on a carrier signal to produce a sampled communication signal, the received communication signal including information encoded in a phase of the received communication signal;
a phase error estimator that estimates an instantaneous carrier phase error and an instantaneous sampling phase error of the sampled communication signal;
a first filter that receives the estimated instantaneous carrier phase error and generates a filtered carrier phase error;
a second filter that receives the estimated instantaneous sampling phase error and generates a filtered sampling phase error; and
a phase correction element that adjusts the phase of the sampled communication signal as a function of the filtered carrier phase error and the filtered sampling phase error,
wherein the second filter receives a first instantaneous sampling phase error, receives a second instantaneous sampling phase error, and filters components from the second instantaneous sampling phase error that vary rapidly from the first instantaneous sampling phase error to generate the filtered sampling phase error.

14. The device of claim 8, wherein the device comprises a wireless communication device.

15. A computer-readable medium comprising instructions that cause a processor to:
receive a communication signal modulated on a carrier signal, the communication signal including information encoded in a phase of the communication signal;
estimate a carrier phase error for the communication signal;
estimate a sampling phase error for the communication signal; and
adjust the phase of the communication signal as a function of the carrier phase error and the sampling phase error by multiplying the received communication signal by a term with a phase that is a function of the estimated carrier phase error and the estimated sampling phase error.

16. The computer-readable medium of claim 15, wherein instructions to adjust the phase of the communication signal comprise instructions to multiply the received communication signal by a term with a phase that is a negative of the sum of the estimated carrier phase error and the estimated sampling phase error.

17. The computer-readable medium of claim 15, further comprising instructions to multiply the estimated sampling phase error by a constant that is a function of a sub-carrier bin from which the received communication signal was extracted.

18. The computer-readable medium of claim 15, further comprising instructions that cause the processor to:
identify an index of a sub-carrier bin from which the received communication signal was extracted; and
adjust the phase of the communication signal as a function of the index of a sub-carrier bin from which the received communication signal was extracted, the estimated carrier phase error and the sampling phase error.

19. An apparatus comprising:
means for receiving a communication signal modulated on a carrier signal, the communication signal including information encoded in a phase of the communication signal;
means for sampling the received communication signal to produce a sampled communication signal;
means for estimating a carrier phase error for the sampled communication signal;
means for estimating a sampling phase error for the sampled communication signal; and
means for adjusting the phase of the sampled communication signal as a function of the carrier phase error and the sampling phase error,
wherein the adjusting means multiplies the sampled communication signal by a term with a phase that is a function of the estimated carrier phase error and the estimated sampling phase error.

20. The apparatus of claim 19, wherein the adjusting means multiplies the sampled communication signal by a term with a phase that is a negative of the sum of the estimated carrier phase error and the estimated sampling phase error.

21. The apparatus of claim 20, wherein the adjusting means multiplies the estimated sampling phase error by a constant that is a function of a sub-carrier bin from which the sampled communication signal was extracted.

22. An apparatus comprising:
means for receiving a communication signal modulated on a carrier signal, the communication signal including information encoded in a phase of the communication signal;
means for sampling the received communication signal to produce a sampled communication signal;
means for estimating a carrier phase error for the sampled communication signal;
means for estimating a sampling phase error for the sampled communication signal;
means for adjusting the phase of the sampled communication signal as a function of the carrier phase error and the sampling phase error; and
means for identifying an index of a sub-carrier bin from which the sampled communication signal was extracted,
wherein the adjusting means adjusts the phase of the sampled communication signal as a function of the index of the sub-carrier bin from which the sampled communication signal was extracted, the estimated sampling phase error and the estimated carrier phase error.

23. The apparatus of claim 19, wherein the receiving means comprise wireless receiving means.

\* \* \* \* \*